United States Patent Office 3,359,122
Patented Dec. 19, 1967

3,359,122
METHOD OF PRESERVATION, PACKAGING AND MOLDING OF FRESH FOODS FOR HUMAN USE
Ralph S. Zebarth and Richard A. Braeking, Kansas City, Mo., assignors to Gordon Johnson Company, Kansas City, Mo., a corporation of Missouri
No Drawing. Continuation of application Ser. No. 266,-061, Mar. 18, 1963. This application Dec. 13, 1966, Ser. No. 601,434
5 Claims. (Cl. 99—194)

This application is a continuation of Ser. No. 266,061, filed Mar. 18, 1963, now abandoned.

This invention relates to the preparation and processing of perishable products, and more particularly, to the preservation, at lowered temperatures, of articles for use as human foods, a primary object being to increase their storage life, to preserve their nutritional value and to provide a novel method of proper preparation, packaging, cold storage and transportation under refrigeration of such foods in a manner appreciably more sanitary and less expensive than has heretofore been possible by conventional methods.

Economic and material losses because of deterioration and spoilage are very large in the food industry. Many of these losses can be prevented by exercising care and control in the preservation, packaging and holding of food products. It is, therefore, a most important object of the instant invention to improve the keeping quality of animal foods by slowing down physical and chemical changes therein prior to its reaching the ultimate consumer, utilizing a method which results in lowering the speed at which food-spoiling chemical reactions take place, slowing down the rate of enzyme action, preventing discoloration and the growth of many harmful microorganisms, and reducing the chances of contamination and adulteration during handling.

Another important object of the present invention is the provision of a method of chilling preservation capable of improving and retaining the texture, flavor and appearance of the resulting food product while, at the same time, reducing costs, labor and other problems for all handlers, including the processor, the carrier, the wholesaler, the retailer and the housewife.

Stored animal foods tend to quickly change in form and color, develop bad odors and flavors, oxidize and dehydrate, turn rancid and develop an "old" appearance and taste. Such changes are hazardous when the product becomes poisonous or toxic, necessitating the prevention of the action of deleterious organisms on the food. Uppermost in importance then is that the product be preserved, packed and held pursuant to our method under sanitary conditions. It must be delivered to the ultimate consumer in complete absence of any filthy, putrid or decomposed substance. The poultry carcass and all parts thereof must in no way be contaminated or adulterated, or otherwise become injurious to health.

While the present invention is especially valuable in the processing and packaging of ready-to-cook poultry and edible products thereof, its range of use is by no means so limited. We contemplate its adaption to the entire field of animal foods for human consumption, including the meat of cattle and calves, sheep, swine and goats, and the edible products derived from their carcasses. Wild animals, fish and game are also not to be deemed as excluded from the concepts of the invention.

Ease of description and understanding of the invention suggests, however, the limitation to a single product; hence, the method will hereinafter be set forth in the sense of commencing with ready-to-cook poultry. By this we shall mean any dressed poultry that is ready to cook without need of further processing, including any cutup or disjointed portion of poultry or any edible part thereof. Such birds as chicken, turkeys, ducks, geese and guineas are, of course, understood to be included within the term "poultry."

Poultry processing has grown rapidly and become one of the largest food industries, primarily because of the relatively recent development of sanitary and economical methods of dressing and subsequent handling of the dressed birds. It is recognized that such growth has been the result in part of the adoption of modern methods of food preservation, such as cold storage, canning, freezing, drying and curing. There remains, however, the demand for freshly dressed poultry wherein appearance and taste remain unaltered; this has, therefore, heretofore necessitated rapid handling and fast transportation between the time of dressing and the moment when the product is placed before the purchasing public.

To accomplish these results, it is the universal practice to utilize ice packing as the primary method of preventing spoilage during the delay that is necessary before the freshly dressed birds are in the hands of the consumer. This method is by no means fully satisfactory and presents many problems not heretofore solved.

Ice packing is an expensive and laborious task. It is by no means as sanitary as might be desired. Spoilage takes place much too frequently unless extreme care is exercised, not only in initial packing procedures, but throughout the time the product must remain in the iced condition. It is not dependable as a method of preservation because the various groups who handle the product cannot be expected, at all times, to continue to follow necessary and strict procedures for preventing spoilage, contamination and adulteration.

Melting of the ice in refrigerated holding rooms and transportation cars and trucks presents a messy and unwholesome condition. Ice-pack containers become water-soaked, soggy and moldy. And finally, unpacking, and the results of thawing of the ice pack, presents many problems, including waste of time, labor and materials, and requires proper facilities and other increased handling costs.

There is presented, therefore, a definite health hazard because it is impossible to avoid contamination and undiscovered spoilage as the result of such continual handling of the product during the steps which must be taken between packing and final sale. Also, to some extent at least, bacterial growth continues and becomes dangerously rapid in exposed or melted areas of the shipping package. Additionally, the ice pack method of packaging is not altogether satisfactory from the standpoint of preservation of taste, texture, nutritional value, palatability and fresh appearance.

In accordance with the principles of the present invention, therefore, it is proposed to place freshly dressed poultry on the market, properly preserved and in a sanitary condition, without any need for ice packing whatsoever. To accomplish the desired results in the method about to be described, speed becomes a factor at the processing plant immediately following the dressing operations, rather than between the time of initial ice packing and the time the product is unpacked and presented for sale to the consumer, as has heretofore been the necessary practice. Additionally, all steps in the method are desirably carried out as a rapid and continuous process without substantial interruption or delay.

Rapid multiplication of microorganisms at warm temperatures can be prevented by rapid chilling. Since about 15 minutes must be allowed for scalding and defeathering, and another 15 minutes for evisceration, the first chilling step must, therefore, for best results, take place immediately after the poultry is dressed. The holding period after killing and before chilling is most critical since birds held too long at high temperatures deteriorate in flavor, develop off-odors, and more important, undergo rapid changes which increase the chances of early spoilage. Chilling should be commenced before any appreciable chemical or physical change by organisms or other action, and prior to contamination of the clean product, which might occur if other handling steps were permitted to intervene. Wholesomeness is an extremely important factor, contemplating that the product be sound, healthful, clean and otherwise fit for human food.

This first step consists then in reducing the temperature of the dressed and ready-to-cook poultry in accordance with operating practices which will at least insure removal of the animal heat as quickly as possible after dressing and at the same time preserve the condition and wholesomeness of the product.

It is not possible to provide an exact definition of quick-chilling or to set any hard and fast rules as to the amount of heat that should be removed in the first chilling step. Basically, however, it must be recognized that undesirable changes takes place in the tissues of poultry in slow chilling, causing it to leak when the temperature is ultimately raised prior to cooking. Manifestly, such leakage results in undesirable changes in texture and should be avoided as much as possible.

Furthermore, during slow chilling, the temperature of the poultry may not be reduced fast enough to prevent spoilage. Hence, as herein used, the term "quick-chilling" may be considered the step which cools the poultry sufficiently and fast enough to prevent spoilage and permits a minimum change in the food tissues. This shall, therefore, be understood to mean cooling immediately after processing, and preferably prior to packaging, so that the internal temperature is reduced to at least 40° F.

Presently available commercial methods of quick-chilling which have proved to be both economical and sanitary, provide for advancement and tumbling of the birds in a tank of low-temperature water, commonly referred to as ice-water chilling. U.S. Letters Patent No. 2,942,429 of June 28, 1960, and U.S. application Ser. No. 749,804, now U.S. Patent 3,092,975 issued June 11, 1963, are incorporated herein by reference, as necessary for a full understanding of such chilling equipment and methods. The time and temperature examples and the operating procedures therein disclosed are adopted herein as satisfactory in carrying out the first step of the process of the instant invention.

Ideally, however, as contemplated by our novel method, the first chilling step should be completed in a matter of minutes and lower the internal temperature of the carcass well below 40° F. More practically, however, because of such factors as economy, it is to be expected that from 15 to 45 minutes might be consumed in this step for chickens, to about 2 hours for turkeys, until the temperature is reduced at least to below 40° F., but not necessarily lower than 32° F., i.e. within the range of 33° F. to 40° F. If such approximate time-temperature factors are followed, the "quick-chilling" definition above set down, will be adequately met in accordance with the principles of the method of the instant invention. Heavier birds often dress-out even above the normal body temperature of 107° F. because of scalding; this, of course, increases the time needed in the first chilling step.

While the first step of the method herein described is, of course, not limited to such cold water bath procedures, when followed, it may be desirable at times to provide as a second step, the draining of excess water from the poultry as it emerges from the bath. But here again, this step need not and should not consume an appreciable amount of time—possibly 2 or 3 minutes for chickens, to about 15 minutes for turkeys, before commencement of the third step. The temperature of the product should not rise to any great extent following quick chilling and certainly not to the extent of permitting leakage of nutritionally valuable body fluids that add to product flavor and are rich in proteins, minerals and vitamins. Actually, a thin coating of ice on the product during holding and shipment is not objectionable; on the contrary, the ice coatings help retain texture and flavor during storage and prevent dehydration.

In this connection, it should be emphasized at this juncture that poultry processing methods must insure that nutritional values are retained. High quality processed poultry, preserved for subsequent use, must compare favorably with cooked fresh foods in protein, mineral and vitamin content and in other nutrient qualities. It must be realized that any treatment causes some losses, particularly where the processed product must be kept for long periods before being used. It cannot be unduly stressed, therefore, that both from the standard of appearance and keeping quality, these important factors must be considered in the present method. Preservation of food values requires the avoidance of fluid leakage throughout the process as distinguished from excessive drainage of such fluids which should, on the other hand, be properly trapped within the body cells and tissues until ready for cooking and serving.

Hence, the process continues rapidly and without interruption to another quick-chilling step which might properly be called "deep-chilling" to provide terminology for distinguishing it from the first step above described.

It should be explained at this point that health authorities today have generally recognized that the growth of most disease-producing bacteria in poultry is sufficiently impeded to control health hazards if the temperature is reduced to below 40° F.

Much lower temperatures are, however, desirable and are necessary to accomplish the results herein contemplated. Also, it is entirely possible to go well below 40° F. and still provide the public with what is properly called freshly dressed poultry as distinguished from frozen, canned or other methods of preservation.

Thus, in the deep-chill step, the temperature is dropped to within a reasonable range below the freezing point of water, for example, between about 28° and 32° F. It is important to note here that this temperature reduction step does not in any manner contemplate freezing because, as above indicated, there must be a sharp and well defined distinction on the market between freshly dressed and frozen poultry. It is necessary to lower the temperature to about 28° F. before poultry can be properly considered a frozen food product or in a solidly frozen state. The freezing point of the product as a whole may properly be considered to be within the range of about 27° F. to about 29° F., depending on the size, type and age of the bird and its constituents, as distinguished from the freezing point of the individual parts, components and solutions thereof, which vary along a wider range below 32° F. Hence, the only ice-forming crystals to be found in the product produced by our method will be those produced on and near the surfaces of the product as the result of light freezing of moisture in the form of free water.

Outstandingly important and valuable, however, is the fact that the food content of the product is adequately preserved within such temperature range, resulting in all of the benefits of spoilage prevention and conservation of nutritional values above explained.

For the most part, the deep chill step may be carried out commercially by either of at least two general procedures. The first of these involves the system of advancement (by immersion and/or spray chilling) through a refrigerated solution as disclosed in U.S. Patents Nos. 3,006,774 of Oct. 31, 1961, and 3,043,319 of July 10, 1962. See also U.S. Patent No. 2,372,373 of Mar. 27, 1945. The solutions therein disclosed, and others which might well be used in this step, may be of such nature however, that the poultry must be covered, necessitating still another step immediately preceding deep chilling.

Since health and sanitation regulations preclude actual contact of the poultry with certain of such solutions, bags or other containers must be employed. Bags made from plastic and other materials substantially impervious to the solutions have been found to be quite satisfactory. Each whole bird may be packaged individually in its own bag, if desired, whereupon, after proper closing and sealing of the bag, the package may be subjected to the cooling solutions without danger of adulteration or contamination. Alternately, as many as a dozen or more birds, for example, may be packaged in a larger bag of similar material selected to withstand considerable abuse in handling.

Still another packaging method which might well be used to advantage prior to the deep-chill step employs a telescoped container such as illustrated in U.S. Patent No. D. 189,379, of Nov. 29, 1960, heat sealed, for example by the method and sealer set forth in U.S. Patent No. 3,071,906 of Jan. 8, 1963. This package has particular value for use in poultry that is cut up into parts prior to the step of deep chilling.

Additionally, poultry parts may be packed through use of a plastic film sealed thereover or be placed in a suitable tray and then enveloped in a film or bag, sealing in both the tray and the product.

There are, of course, many other kinds of moisture-vapor-proof wrappings and packages capable of protecting the product during storage so that it will retain proper appearance, will not lose moisture and will not be subjected to contamination and adulteration as the result of handling and other adverse conditions that are not conducive to sanitation and wholesomeness. Not to be overlooked also, is the random and loose packaging of poultry parts in containers as distinguished from packing in preselected order in trays.

The water content of poultry meat may range from about 71% for broilers with a 7% fat content, to about 56% for hens having a 25% fat content. Hence, there is a direct economic disadvantage in shrinkage from loss of this water content by dehydration during improper processing, chilling, packaging and holding steps. Loss of water also results in appearance changes, loss of nutrients and flavor and reduction in consumer acceptance. Here again then, leakage and dehydration can be reduced to a minimum by packaging in material that is reasonably moisture impermeable.

A second procedure which may be followed obviates the necessity of pre-packaging since it uses a refrigerant that has no inherent danger of contamination. It uses a conveyor belt, a screw conveyor, or other means of rapid and continuous advancement of the product through an insulated tunnel wherein carbon dioxide gas is released to shower over the product at a rate and over a short period of time (conceivably within a matter of seconds) to attain the deep-chill temperatures above suggested.

Many other methods, such as air blast chilling wherein, for example, the air temperatures could range from —20° F. to —40° F., might well be used provided that the step can be carried out quickly and economically on a commercially profitable basis. The time factor remains important and it is usually not feasible to permit more than from about 20 to 30 minutes to be consumed in the deep chilling step of the method of the present invention.

In both chilling steps, the duration of immersion may, of course, be decreased to some extent as the temperature of the coolant is reduced. Manifest also is the fact that the time-temperature combination will vary with the kind, age and class of poultry being processed.

Any other chilling procedures (for either or both of the chilling steps above outlined) which will effect chilling in a manner equal to that obtained by the procedures hereinabove set forth, may be employed to carry out the method of our instant invention. The important factor is to lower the temperature of the product so that it will temper out at about 30° F. plus or minus 2 degrees when subsequently held, shipped and stored at approximately 30° F. Tests have indicated that a 4 to 5 pound bird, previously chilled to 32° to 40° F., subjected to the deep-chill step of our method will, in 15 to 18 minutes have a surface temperature of 0° to 5° F., an outer marginal temperature of about 20° F., and an internal temperature of about 34° F. When held in cold storage at 28° to 32° F., it will temper out to 30° F. throughout in 2 to 3 hours.

In summary, then, the product should be allowed to temper out to a final temperature below the freezing point of water and above the freezing point of the flesh of the product.

No time should be lost in now advancing the product to a point where the attained deep-chill temperatures are maintained. For the most part, the daily output of many poultry processing plants is conveyed directly to refrigerated trucks for rapid transportation to markets and sale within a matter of hours or but a day's delay. Others utilize refrigerated holding rooms for at least a part of such output.

In any event, it is neither difficult nor expensive to maintain the space in which the poultry is stored or transported at temperatures which will insure maintenance of within about a 28° F. to 32° F. range.

As thus far outlined, the method involves the quick-chill step, possibly followed by draining if excess moisture removal is deemed necessary or desirable, then the deep-chill step and finally the step of maintaining the attained temperature, preferably until sold to the ultimate consumer. The method also calls for packaging either before or after chilling, or between the two chilling steps, for purposes of moisture retention and sanitation regardless of whether or not the packaging is needed to also protect the product from the chilling solutions or substances.

It is to be made clear, however, that the attainment of the temperature wherein the product tempers out at about 28° to 32° F. need not be two distinct steps. Instead, the freshly dressed product may be continually and rapidly chilled as a single step and then packaged for holding or shipment.

While sources of bacterial contamination in poultry include the environment of the live bird and the processing steps from killing to complete dressing, one of the greatest bacterial hazards is the marketing of chilled ready-to-cook poultry. After about one week at usual commercial holding temperatures, bacterial spoilage normally renders the product unacceptable.

It can be expected, on the other hand, that poultry will be good for three or more weeks under our method if held substantially at 30° F. It is to be recognized, however, that the maintenance of the proper temperature can be fully followed only to the extent that those using the method have control of the product. The processor can, of course, easily adhere to this last step in holding rooms prior to shipment. And, it can be expected that the carrier will fully cooperate.

Unloading by the carrier at the wholesale level might result in some warming of the product, especially under adverse weather conditions, but for the most part the product will still be in good condition by the time it is within the cold storage facilities of the wholesaler. Delivery of the product by the wholesaler to the retailer may not always take place in refrigerated vehicles, but the time factor is not usually so great as to present any grave problem. Finally, at the retail level, proper storage and display facilities are today quite normal, with the result that the product can be placed in the hands of the customer at about the same temperature as it had immediately prior to shipment from the processor. Hence, there is a considerable safety factor in the method, permitting a certain amount of sub-standard handling between processor and housewife.

The packaging step can and will vary considerably. In some instances, the processor will place the product in the consumer package, enclosed for the purpose of display and sale to household consumers. At other times, the immediate container may not be the consumer package but some other enclosure in which the product is packed. Then, of course, it is to be expected that shipping containers will be employed for receiving either the immediate containers or the consumer packages. For example, if a dozen birds are placed in an immediate container such as a single plastic bag, a number of such bags may in turn be placed in a shipping container made from wood, cardboard or other material.

Finally, while chilling, as a single, continuous step, has been hereinabove mentioned, sanitation still remains the most important factor. The first chilling step, ahead of the deep-chill step is, therefore, to be preferred because, as disclosed in said application Serial No. 749,804, cleaning of the product and prevention of dehydration are salient features of the equipment and the method therein disclosed.

Immediate wet chilling also has the advantage of reducing or preventing discoloration. Slush ice cooling removes animal heat rapidly, reduces shrink and has a bleaching effect that improves the finish of the bird, resulting in a bright, fresh-appearing product.

Furthermore, we consider the packaging step of our present method to be important from a sanitation and a moisture retention standpoint. Such step is much easier and more practical at the end of the quick-chill step, when the muscles and flesh of the bird are still rather soft and pliable, than after the deep-chill step. We have found also that economies tend to dictate that all three steps be followed, and in that order, with emphasis on three factors—lowered temperatures, rapid handling and good sanitation in order to maintain quality throughout all channels of marketing.

It is now abundantly clear and can be fully appreciated that the instant method has many advantages over conventional ice pack procedures, resulting in a decidedly better product and increased profits for the food processing industry generally. Excellent consumer acceptance of poultry, marketed after processing in accordance with the present invention, can be expected, since it will have no evidence of deterioration during storage and will have retained its fresh surface appearance, flavor, tenderness and palatability. Tremendous yearly savings in reduced spoilage and deterioration can thus be passed on to the consumers with better quality and at a lower cost.

What is claimed is:

1. A method of preservation and packaging of poultry comprising the steps of:
    chilling freshly dressed poultry to a temperature for preventing rapid growth of most harmful, pathogenic, disease-producing bactteria; thereupon
    lowering the temperature of the poultry to within a range of approximately 28° F. to 32° F. to freeze the free water on the surface of the poultry without freezing the tissues thereof; and
    packing a plurality of individual units of said poultry in a single shipping container.

2. A method of preservation, packaging and holding of poultry comprising the steps of:
    chilling freshly dressed poultry to a temperature for preventing rapid growth of most harmful, pathogenic, disease-producing bacteria; thereupon
    lowering the temperature of the poultry to within a range of approximately 28° F. to 32° F. to freeze the free water on the surface of the poultry without freezing the tissues thereof;
    packing a plurality of individual units of said poultry in a single shipping container; and
    maintaining the poultry at the attained temperature during storage and shipment.

3. A method of preservation, packaging and holding poultry comprising the steps of:
    chilling freshly dressed poultry in a cold water bath to clean the same until the temperature thereof is lowered sufficiently to prevent rapid growth of most harmful, pathogenic, disease-producing bacteria; thereupon
    packaging individual units of said poultry in separate containers to protect the same from contamination and adulteration and to prevent dehydration; then
    lowering the temperature of the poultry to within a range of approximately 28° F. to 32° F. to freeze the free water on the packaged poultry without freezing its tissues and other body fluids; and finally
    placing the packaged poultry in cold storage at the attained temperature until the same is marketed.

4. A method of preservation of meat comprising the steps of:
    removing heat from freshly dressed meat until rapid growth of most harmful, pathogenic, disease-producing bacteria is prevented; thereupon
    subjecting the meat to a temperature maintained at least as low as 32° F. to freeze the free water on the surface of the meat without freezing its tissues and other body fluids, and then,
    subjecting the meat to a temperature maintained at approximately 28° F. to 32° F. to cause the meat to temper out below 32° F. and above 28° F.

5. A method of preservation of poultry comprising the steps of:
    chilling freshly dressed poultry to a temperature for preventing rapid growth of most harmful, pathogenic, disease-producing bacteria; thereupon
    subjecting the poultry to a cooling medium having a temperature within a range of approximately 28° F. to 32° F. to freeze the free water on the surface of the poultry without freezing the tissues thereof; and
    then placing the poultry in cold storage maintained at a temperature of approximately 28° F. to 32° F. to cause the poultry to temper out below 32° F. and above 28° F.

References Cited

UNITED STATES PATENTS

| 1,322,312 | 11/1919 | Larsen | 99—194 |
| 2,329,226 | 9/1943 | Stafford et al. | 99—194 |
| 2,860,056 | 11/1958 | Bradford | 99—194 |
| 2,942,429 | 6/1960 | Van Dolah et al. | 99—194 |
| 3,111,412 | 11/1963 | Mouk | 99—195 |

OTHER REFERENCES 616,511   2/1961   Canada.

A. LOUIS MONACELL, *Primary Examiner.*

L. M. SHAPIRO, *Assistant Examiner.*

Disclaimer 3,359,122.—*Ralph S. Zebarth* and *Richard A. Braeking*, Kansas City, Mo. METHOD OF PRESERVATION, PACKAGING AND MOLDING OF FRESH FOODS FOR HUMAN USE. Patent dated Dec. 19, 1967. Disclaimer filed Sept. 15, 1971, by the assignee, *Gordon Johnson Company*.

Hereby enters this disclaimer to claims 1–5, inclusive, of said patent.
[*Official Gazette January 25, 1972.*]